March 28, 1939. L. VON REIS 2,152,423
PRODUCTION OF FIBERS OR THREADS FROM GLASS,
SLAG, AND THE LIKE MELTABLE MATERIALS
Filed Dec. 15, 1934

Inventor:
Lambert Von Reis
by Dorsey & Cole
Attorneys

Patented Mar. 28, 1939

2,152,423

UNITED STATES PATENT OFFICE 2,152,423

PRODUCTION OF FIBERS OR THREADS FROM GLASS, SLAG, AND THE LIKE MELTABLE MATERIALS

Lambert von Reis, Herzogenrath, Germany, assignor to Naamlooze Vennootschap Maatschappij tot Beheer en Exploitatie van Octrooien, The Hague, Netherlands Application December 15, 1934, Serial No. 757,711
In Germany December 18, 1933

10 Claims. (Cl. 83—91)

This invention relates to a method of and apparatus for the production of fibers or threads from glass, slag and the like meltable materials, in which the hot molten mass is flown in a preferably continuous thin stream from the outlet of a suitable tank, such as a melting furnace, onto the surface of a rapidly rotating disc from which it is thrown off by centrifugal action in the form of fine threads.

The invention consists in subjecting the liquid mass while distributing on the disc to the action of blasts of air, gas, steam or the like, these blasts being directed so that they promote and accelerate the distribution and division of the liquid mass produced by the centrifugal action of the rotating disc.

By applying this improved method a considerable increase of the rate of production of the fibers or threads is attained. The forces produced by the blasts cooperate with the centrifugal forces produced by the rotation of the disc so that the mass delivered to the disc will distribute quicker on the disc and will move quicker to the disc periphery where the thread formation proper occurs, and particularly will be thrown at a higher speed off the periphery and divided into fine threads. It is therefore possible to supply to the disc and work within the unit of time a correspondingly larger quantity of material. On the other hand, if it is intended not to increase the output or to increase it only slightly, the speed of rotation of the disc may be lowered correspondingly, which may sometimes be desirable.

For carrying out the method, blast nozzles connected with supply pipes for the blowing medium are arranged above the disc at an inclination towards the surface thereof and preferably directed in the direction in which the liquid mass or the threads are thrown off the disc.

Several embodiments of devices according to the invention are illustrated, by way of example, in the accompanying drawing.

Figure 1:
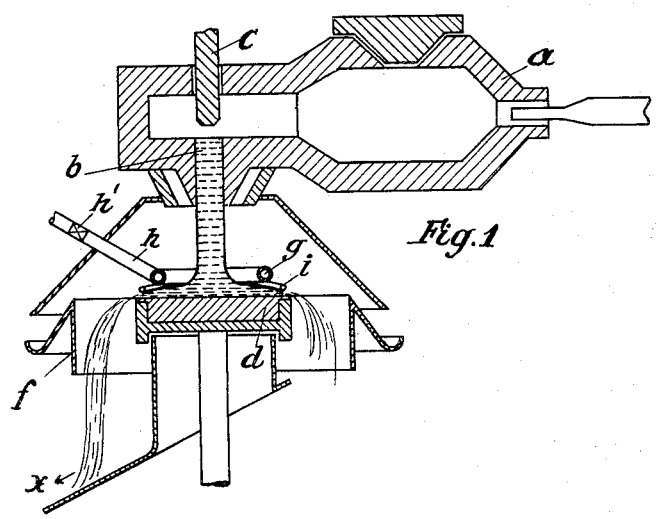
Figure 2:
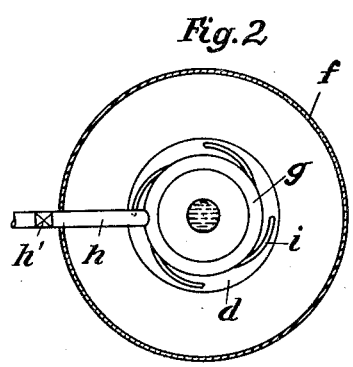
Figure 4:
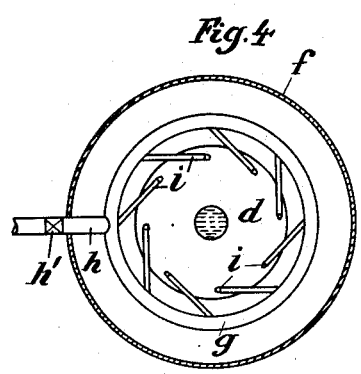
Figure 3:
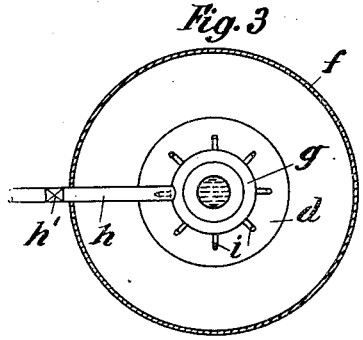

In the drawing, Fig. 1 is a vertical section of an apparatus for producing glass fibers or threads with the improved device according to the invention; Fig. 2 is a plan view of the device; Figs. 3 and 4 are sectional views of blowing devices of somewhat modified forms.

$a$ designates the melting tank for the working material. $b$ is the outlet which is controlled by a stopper $c$ and through which a continuous thin stream of molten mass is allowed to flow onto the centrifuging disc $d$ which is driven at a high speed. The mass distributes uniformly on the disc $d$ towards the disc periphery and under the action of the centrifugal force is thrown off the disc in the form of fine threads. The threads produced form a jacket-like envelope which sinks down around the disc and its shaft in the space encased by the wall $f$. The envelope of threads is severed continuously or intermittently and carried off in the direction of the arrow $x$.

Arranged above the centrifuging disc $d$ in concentric relation thereto is an annular pipe $g$ which is connected to a pipe $h$ and provided with a number of blowing nozzles $i$. The pipe $h$ serves to supply air under pressure, steam or gas to the nozzles and is provided with a regulating valve $h'$. The nozzles are inclined from the pipe $g$ towards the surface of the centrifuging disc and directed towards the margin of the disc so that the distribution and division of the liquid mass delivered to the disc is promoted by the blasts ejected by the nozzles in the manner indicated above. The nozzles are preferably arranged so that they extend substantially in the direction in which the mass or threads are thrown by the centrifugal force.

With the embodiment according to Figs. 1 and 2, the nozzles are curved and arranged so that their mouths lie closely to the periphery of the disc. They will therefore exert their action mainly at the disc periphery to produce or accelerate the formation of threads, while the distribution proper of the mass on the disc is effected by the rotation of the disc. According to Fig. 3, the nozzles extend radially from the disc centre and exert their action on the mass already at a comparatively great distance from the disc periphery, thereby effecting in the main a quick distribution of the mass on the disc. Fig. 4 shows an arrangement with which the nozzles extend parallelly to tangents of a circle having the same center as the periphery of the disc but of smaller radius. In this case, the blasts of the nozzles accelerate both the distribution on the disc and the division of the mass into threads. With the latter embodiment the annular pipe $g$ carrying the nozzles is arranged beyond the periphery of the centrifuging disc, while with the forms according to Figs. 1, 2 and 3 this pipe is arranged inside the disc periphery.

It will also be within the spirit of the invention to provide several nozzle rims which may be arranged so that one series of nozzles acts to promote the distribution of the mass on the disc and another series to aid in the formation of the threads at the disc periphery.

Having thus described my invention, what I claim as new and desire to secure by Letters Patent is:

1. In an apparatus for producing fibers from molten glass, slag and the like meltable materials, in combination a tank for molten material, an outlet in this tank wherethrough to discharge a stream of the molten material, a rapidly horizontally rotating solid body below the outlet whereon to deliver the stream of molten material and means above the rotating body directing blasts of gaseous medium under pressure at a plurality of points on the liquid mass on the rotating body in a substantially horizontal direction outwardly in respect to the center of the rotating body.

2. In an apparatus for producing fibers from molten glass, slag and the like meltable materials, in combination a tank for molten material, an outlet in the bottom of this tank wherethrough to discharge a stream of the molten material, a rapidly rotating disc whereon to deliver the stream of molten material, this disc being disposed in a horizontal plane below the said outlet, and a plurality of nozzles arranged above the said disc and connected with means for supplying a gaseous medium under pressure to the nozzles, these nozzles being slightly inclined towards the surface of the disc and directed substantially in tangents to a circle concentric with the periphery of the disc and of smaller radius.

3. A method of producing fibers from molten glass, slag and the like materials, consisting in delivering a stream of the molten material on to a horizontal disc, causing such material to spread over such disc radially in all directions, and to be projected in fibrous form from its periphery by centrifugal force due to the rotation of the disc around a vertical axis coincident with that of the stream, and assisting such movement of the molten material by properly directed air blasts.

4. A method of producing fibers from molten glass, slag and the like materials, consisting in delivering a stream of the molten material on to a horizontal disk, causing such material to spread over such disc radially in all directions, and to be projected in fibrous form from its periphery by centrifugal force due to the rotation of the disc around a vertical axis coincident with that of the stream, and assisting the radial movement of the molten material by air blasts directed on the glass on the disc.

5. A method of producing fibers from molten glass, slag and the like materials, consisting in delivering a stream of the molten material on to a horizontal disc, causing such material to spread over such disc radially in all directions, and to be projected in fibrous form from its periphery by centrifugal force, due to the rotation of the surface around a vertical axis coincident with that of the stream, and assisting such movement of the molten material by air blasts directed on the glass on the disc tangentially to circles concentric with the periphery of the disc and of less radius.

6. In an apparatus for producing fibers from molten glass, slag and the like meltable materials, the combination with a horizontally rotating disk, means for delivering thereon a stream of molten material and means located above the disk and adjacent to the upper edge thereof for directing a blast of gaseous medium under pressure at a plurality of points in a substantially horizontal direction outwardly in respect to the center of the rotation disk.

7. A method of producing fibers from molten glass, slag and the like materials, consisting in delivering a stream of the molten material on to a horizontal disk, causing such material to spread over such disk radially in all directions, and to be projected in fibrous form from its periphery by centrifugal force due to the rotation of the disk around a vertical axis coincident with that of the stream, and assisting the formation of the fibers by properly directed air blasts.

8. A method of producing fibers from molten glass, slag and the like materials, consisting in delivering a stream of the molten material on to a horizontal disc, causing such material to spread over such disc radially in all directions, and to be projected in fibrous form from its periphery by centrifugal force due to the rotation of the disc around a vertical axis coincident with that of the stream, and assisting the movement of the molten material by air blasts directed substantially in the direction, in which the fibers are thrown by the centrifugal force of the molten material by properly directed air blasts.

9. A method of producing fibers from molten glass, slag and the like materials, consisting in delivering a stream of the molten material on to a horizontal disc, causing such material to spread over such disc radially in all directions, and to be projected in fibrous form from its periphery by centrifugal force due to the rotation of the disc around a vertical axis coincident with that of the stream, and assisting the radial movement of the molten material by air blasts directed substantially in the direction of the said radial movement of the molten material by air blasts directed on the glass on the disc.

10. A method of producing fibers from molten glass, slag and the like materials, consisting in delivering a stream of the molten material on to a horizontal disc, causing such material to spread over such disc radially in all directions, and to be projected in fibrous form from its periphery by centrifugal force due to the rotation of the disc around a vertical axis coincident with that of the stream, and assisting the formation of the fibers by air blasts directed substantially in the direction in which the fibers are thrown by the centrifugal force by properly directed air blasts.

LAMBERT von REIS.